United States Patent [19]

Carbone

[11] 4,333,237

[45] Jun. 8, 1982

[54] APPARATUS FOR COMPARING THE DISTANCE OF TWO BALLS FROM A THIRD BALL

[76] Inventor: Nazzareno E. Carbone, Viale S. Martino, Isol. 12, Messina, Italy

[21] Appl. No.: 222,526

[22] Filed: Jan. 5, 1981

[30] Foreign Application Priority Data

Jan. 3, 1980 [IT] Italy ............................ 18701 A/80
Dec. 22, 1980 [IT] Italy ............................ 50444 A/80

[51] Int. Cl.³ ............................................ G01B 5/14
[52] U.S. Cl. ...................................... 33/143 R; 33/158
[58] Field of Search ............... 33/143 R, 143 M, 158, 33/159, 160, 161, 138, 270

[56] References Cited

FOREIGN PATENT DOCUMENTS

| 457002 | 6/1949 | Italy ........................... 33/143 R |
| 7424 | of 1894 | United Kingdom ................. 33/161 |
| 11206 | of 1895 | United Kingdom ................. 33/27 C |
| 9507 | of 1905 | United Kingdom ................. 33/158 |

Primary Examiner—Harry N. Haroian
Attorney, Agent, or Firm—Finnegan, Henderson, Farabow, Garrett & Dunner

[57] ABSTRACT

An apparatus for comparing the distances of two balls from a third ball which all lie on a horizontal plane comprises a telescopic rod pivotally mounted to swing around the vertical axis of a stand which rests on the same plane as the balls. At the free end of the telescopic rod a vertical strip is attached which is brought to successively contact said two balls for comparing their distances from the third ball. The telescopic rod stand is provided with means for centering it vertically over the third ball. A dolly is inserted between the end of the telescopic rod and said vertical strip for supporting the rod, which dolly can be moved along a circle centered on the axis of said stand; said dolly being provided with a rack-and-pinion device for micrometrically approaching said strip to a ball.

2 Claims, 7 Drawing Figures

Fig. 1
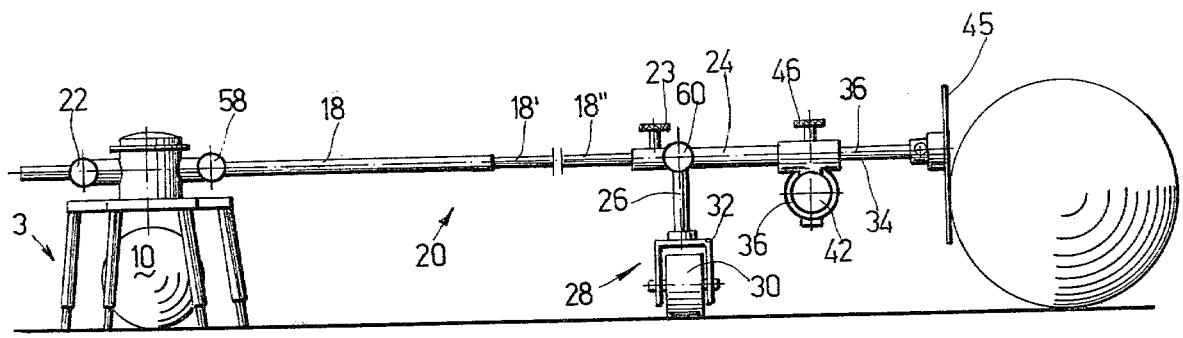
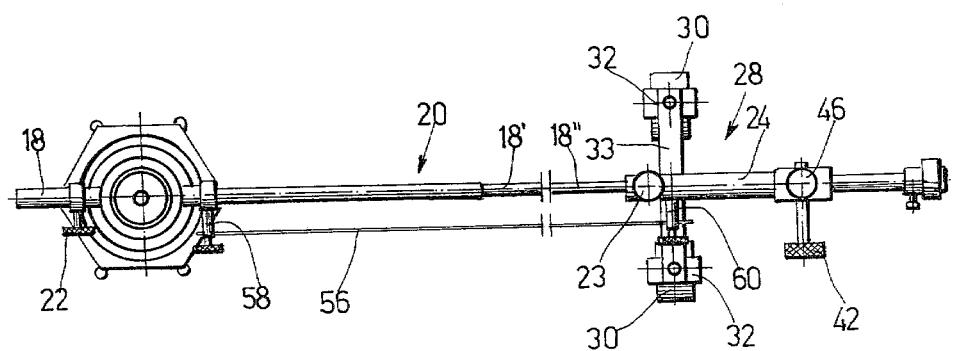
Fig. 5

APPARATUS FOR COMPARING THE DISTANCE OF TWO BALLS FROM A THIRD BALL

The present invention relates to an apparatus for comparing the distances of two balls from a third ball all of which are lying on the same substantially horizontal plane.

The apparatus is particularly useful for comparing the distances of two bowls from the jack in the game of bowls, or for comparing the distances of two balls from any other ball in billiards.

Throughout the following description the terms will be used which apply to the game of bowls. However, it is understood that the apparatus can be used with slight modifications in billiards.

This apparatus comprises three main components: a plate with supporting legs which form altogether a cagelike stand and is provided with means for centering it over the jack; an extensible horizontal rod pivotally mounted on said stand to rotate about the vertical axis of the same; a dolly connected to the free end of said rod for carrying it while it moves circularly about the vertical axis of said stand, a touch or grazing member being connected to said dolly which member is moved micrometically towards and away from the bowl to be measured through a rack-and-pinion device.

The invention will be better understood from the following description and attached drawings which illustrate, by ways of example a preferred embodiment thereof.

In the drawings:

FIG. 1 shows a side view of the apparatus of the invention;

FIG. 5 shows a plan view of the whole apparatus;

With reference to the drawings, the apparatus of this invention comprises a stand 3 consisting of a hexagonal plate 2 mounted on substantially vertical legs 4 which are regularly spaced along a circle around the vertical central axis of the stand so as to form with said plate a sort of cage.

Legs 4 are long enough for sustaining plate 2 at a level somewhat higher than the jack 10 summit.

Figure 2:
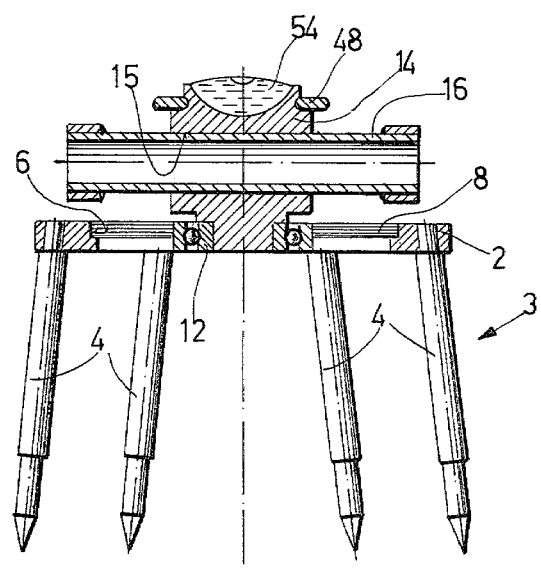
FIG. 2 shows a vertical axial cross section of the apparatus stand.
Figure 3:
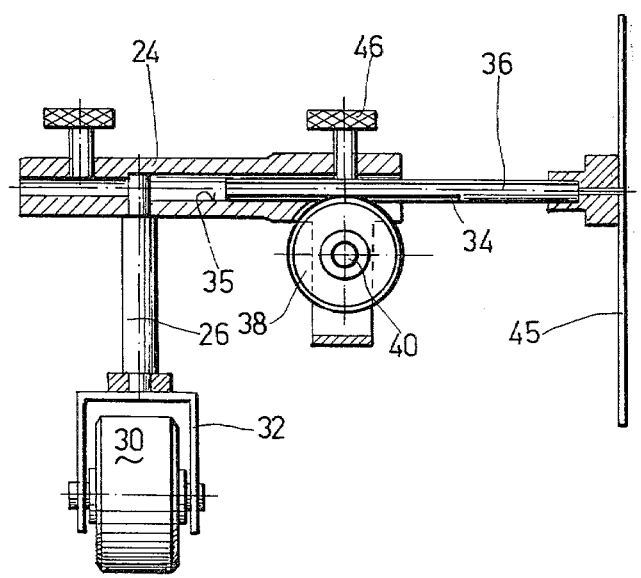
FIG. 3 shows a vertical cross section of the rod carrying dolly along the vertical symmetry plane thereof.
Figure 4:
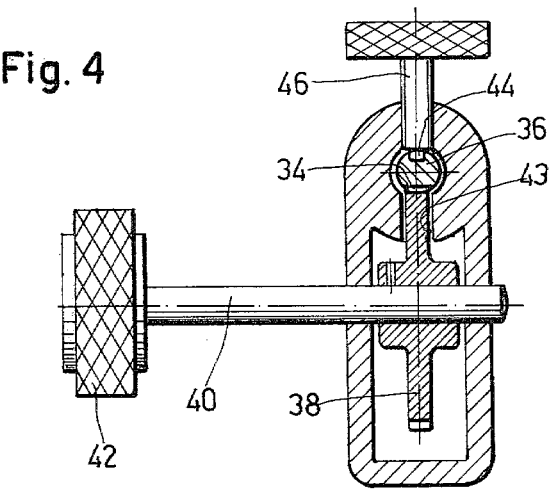
FIG. 4 shows, in an enlarged scale, a vertical cross section of the rack-and-pinion device along a plane perpendicular to the longitudinal axis of the telescopic rod.
Figure 6:
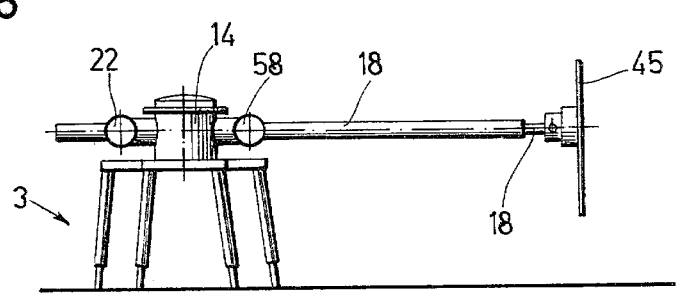
FIG. 6 shows a side view of the apparatus with the touching strip directly connected to the free end of the telescopic rod.
Figure 7:
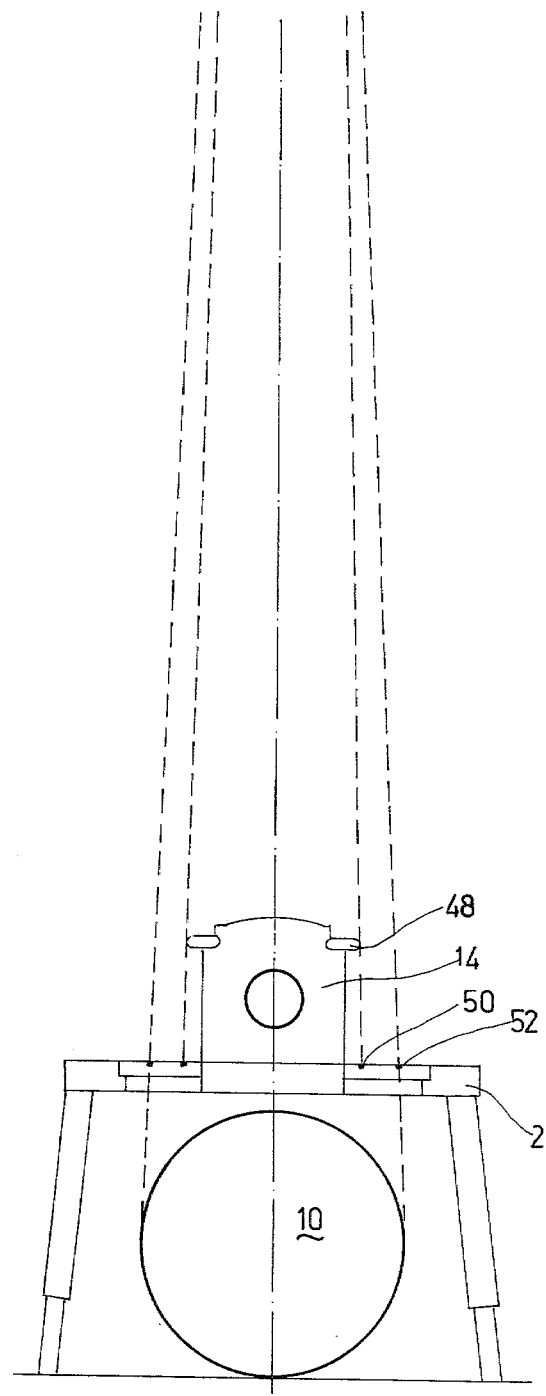
FIG. 7 shows a diagram of the sighting system for centering the stand on the jack.

The lower ends of legs 4, as shown in FIG. 2, are ponted; however when the playing ground is soft they can be provided each with a rubber shoe with wide contact surface with the ground in order to prevent the sinking of the leg thereinto. In any case, when the apparatus is to be used on a cloth covered billiard table, the legs must terminate with a rubber ferrule. A central hole is provided through plate 2 for embedding a transparent disc 8 therein of which the diameter is substantially larger than the jack 10. A circular hole is provided at the center of disc 8 in which hole a ball bearing 12 is seated through a bushing 13 on which bearing a cylindrical hub 14 is mounted.

A diametrical hole 15 is provided through hub 14, in which hole a sleeve 16 is firmly inserted which protrudes from both vertical sides of the hub but does not project beyond the periphery of plate 2. The free end of the largest diameter section 18 of a telescopic rod 20 is slidably received into said sleeve 16 and by means of a set screw can be screwed in a position at will with respect to sleeve 16. Rod 20 is a conventional telescopic rod having sections (18, 18', 18") that slide within or over one another.

The free end of telescopic rod 20, that is the end of the smallest diameter section 18", is fitted into an axial hole of a cylindrical body 24 which is mounted through a vertical post 26 on a dolly 28 comprising two coplanar wheels 30 of which the axes are parallel and equidistant from the vertical axial plane of body 24.

The two wheels 30 are mounted on respective forks 32 which reciprocally are connected by a rigid elongated member 33 perpendicular to the vertical axial plane of body 24, the lower end of post 26 being attached to member 33 at the end of its length. A set screw 23 is provided for securing section 18" to body 24.

A cylindrical axial hole 35 is provided in body 24 from the end thereof opposite to rod section 18" for receiving a slidable bar 36 thereinto having teeth on one side—that is a rack 34–for gearing with those of a pinion 38 rotatably mounted under the body on a shaft 40 perpendicular to the vertical axial plane of body 24. A knurled knob 42 is fitted at one end of shaft 40 for rotating it. Body 24 is provided with a slot 43 through which pinion 38 passes to mesh with rack 34.

A vertical strip 45 is connected to the end of bar 36 which can be micrometrically moved towards and away from the bowl to be measured by rotating knob 42. Bar 36 over its upper side has a groove 44 into which the end of a set screw 46 is driven which is threadingly engaged with a radial bore of body 24. The purpose of screw 46 is for preventing bar 36 from rotating and for securing it with respect to body 24 when the screw is fully tightened.

The means for centering stand 3 and consequently plate 2 over jack 10, that is for making the vertical axis of the stand coincide with the vertical axis of the jack, comprises a distinctively colored ring 48 disposed around the upper edge of hub 14 and two rings of different color traced on the upper face of a transparent disc 8 concentrically therewith, the outer 52 of said rings having about the diameter of the jack, the diameter of the inner ring 50 being about the same as the outer diameter of ring 48.

An operator while sighting from above along an estimated vertical line and maintaining ring 48 centered within circle 50 tentatively displaces the stand on the ground until jack 10 is also centered within circle 52.

By this operation the certainty is reached that the axis of rotation of rod 20 passes through the jack center. However, for an accurate measurement of the two distances to be compared, which are obviously in two different directions, the axis of rotation of rod 20 must be vertical. Thus a circular spirit level is set on top of hub 14 for checking the verticality of stand 3.

A collar fitted on the end of one of the extensions of sleeve 16 carries a stud with inner longitudinal threaded hole for a clamping screw and a transverse through hole for receiving and clamping an unextensible wire or cord 56 therein. A similar device 60 is attached to body 24 for clammping the same wire 56. The purpose of such arrangement is for checking that the telescopic rod length has not changed during the transfer from one to the other bowls to be compared.

OPERATION OF THE APPARATUS

First the distance of the bowl to be measured from the jack is evaluated by sight or by other means with an approximation within the limits of the rack stroke and the length of rod 20 is adjusted accordingly, then stand 3 is centered on jack 10 as set forth hereinbefore. Stick 45 is then approached to the bowl to be measured by acting on knob 42 until a grazing contact is achieved between stick 45 and the bowl. Wire 56 is then clamped in clamping devices 56 and 60. Subsequently the same operation is repeated for another bowl for finding out which of the bowls is closer to the Jack.

When a bowl to be measured is very close to the jack, dolly 28 is removed from rod 20 and stick 45 is removed from the trolley and directly connected to the end of section 18″. Then the rod sections (18′, 18″ etc) are fully retracted within one another and into the largest section 18. The latter is then slid along sleeve 16 and again clamped by set screw 22. In this manner, a distance can be measured which can be as short as about one half of the jack diameter.

A preferred embodiment of the invention has been thus described. Obviously many modifications and variants can be envisaged by those skilled in the art.

The following claims are meant to cover all such modifications and variants which are made in the true spirit of the invention.

What is claimed is:

1. An apparatus for comparing the distances between a first ball and other balls all lying on the same substantially horizontal plane, said apparatus comprising a stand having a plate supported by legs which stand will fit over the first ball, a rotatable hub supported by said plate and extending outwardly above said plate, a telescopic rod mounted on said hub for rotation in a horizontal plane, said rod being extensible to the positions of said other balls and a means for centering said stand over said first ball, said centering means including a ring of distinctive color around the upper edge of said hub, a circular flat disk of transparent material embedded in said plate, and two rings of different color concentric with the disk and traced in said disk, one of said rings having about the same diameter as said ring around the hub and the other having about the same diameter of said first ball.

2. An apparatus as claimed in claim 1 which further comprises a dolly consisting of a cylindrical horizontal body connected through a vertical strut to a cross-bar which carries two coplanar wheels one at each end of the crossbar while a rack slidably fitted in an axial bore of said cylindrical body meshes with a pinion which penetrates into said bore through a slot of which said body is provided and is mounted on a shaft provided with a knob; a vertical grazing stick being connected to the free end of said rack; said cylindrical body being provided at its end opposite to said stick with an axial bore for receiving the free end of said rod section of smallest diameter; a setscrew being provided for connecting said free end to said body.

* * * * *